(12) United States Patent
Goenka et al.

(10) Patent No.: US 10,202,019 B2
(45) Date of Patent: Feb. 12, 2019

(54) HVAC BLOWER

(71) Applicant: VISTEON GLOBAL TECHNOLOGIES, INC., Van Buren Township, MI (US)

(72) Inventors: Lakhi Nandlal Goenka, Ann Arbor, MI (US); Eric Keith Haupt, Livonia, MI (US); Heidi Crandall, Northville, MI (US)

(73) Assignee: HANON SYSTEMS, Daejeon-si (KR)

( * ) Notice: Subject to any disclaimer, the term of this patent is extended or adjusted under 35 U.S.C. 154(b) by 630 days.

(21) Appl. No.: 13/753,903

(22) Filed: Jan. 30, 2013

(65) Prior Publication Data

US 2014/0213166 A1 Jul. 31, 2014

(51) Int. Cl.
*B60H 1/26* (2006.01)
*B60H 1/24* (2006.01)
*B60H 1/00* (2006.01)

(52) U.S. Cl.
CPC ......... *B60H 1/242* (2013.01); *B60H 1/00207* (2013.01); *B60H 2001/00228* (2013.01)

(58) Field of Classification Search
CPC ............... B60H 1/00207; B60H 1/242; B60H 2001/00228
USPC ................................ 454/139, 143, 146, 149
See application file for complete search history.

(56) References Cited

U.S. PATENT DOCUMENTS

| | | | | |
|---|---|---|---|---|
| 2,696,774 A | * | 12/1954 | Bayley | B60H 1/246 237/12.3 B |
| 3,638,551 A | * | 2/1972 | Morchen | B60H 1/242 454/146 |
| 3,919,926 A | * | 11/1975 | Yamada | B60H 1/246 454/144 |
| 4,802,405 A | * | 2/1989 | Ichitani | B60H 1/00007 165/100 |
| 5,222,372 A | | 6/1993 | DeRees et al. | |
| 5,277,038 A | | 1/1994 | Carr | |
| 5,553,662 A | | 9/1996 | Longardner et al. | |
| 5,816,064 A | | 10/1998 | Moore et al. | |
| 6,068,046 A | | 5/2000 | Pommier et al. | |
| 6,276,166 B1 | | 8/2001 | Sarkisian et al. | |
| 6,332,330 B1 | * | 12/2001 | Loup | B60H 1/00028 165/42 |
| 6,361,429 B1 | * | 3/2002 | Pawlak, III | B60H 1/00207 454/139 |
| 6,691,527 B2 | | 2/2004 | Bureau et al. | |
| 6,854,513 B2 | | 2/2005 | Shirota et al. | |
| 7,147,071 B2 | | 12/2006 | Gering et al. | |

(Continued)

FOREIGN PATENT DOCUMENTS

DE 10147113 A1 4/2003
DE 10307641 B3 4/2004
(Continued)

*Primary Examiner* — Vivek K Shirsat
(74) *Attorney, Agent, or Firm* — Shumaker, Loop & Kendrik, LLP; James D. Miller

(57) ABSTRACT

The invention relates to a heating, ventilation, and air conditioning (HVAC) system for a motor vehicle, the HVAC system having a length greater than a width and disposed with the length parallel to a longitudinal axis of the motor vehicle between the front seats thereof. The HVAC system includes a blower assembly disposed beneath an instrument panel of the motor vehicle or inside an engine compartment.

12 Claims, 4 Drawing Sheets

(56) References Cited

U.S. PATENT DOCUMENTS

| | | | |
|---|---|---|---|
| 7,156,156 B2 | 1/2007 | Haller et al. | |
| 7,478,670 B2 | 1/2009 | Richter et al. | |
| 7,735,330 B2 | 6/2010 | Richter et al. | |
| 7,879,122 B2 | 2/2011 | Richter et al. | |
| 8,191,618 B2 | 6/2012 | Gering et al. | |
| 8,302,417 B2 | 11/2012 | Major et al. | |
| 8,613,200 B2 * | 12/2013 | LaGrandeur | B60H 1/00478 165/41 |
| 2005/0011640 A1 * | 1/2005 | Tohda | B60H 1/00007 165/202 |
| 2005/0045320 A1 | 3/2005 | Richter et al. | |
| 2005/0116054 A1 | 6/2005 | Richter et al. | |
| 2006/0000595 A1 * | 1/2006 | Kang | B60H 1/00064 165/203 |
| 2008/0110184 A1 * | 5/2008 | Hirooka | B60H 1/00028 62/97 |
| 2008/0230204 A1 | 9/2008 | Richter et al. | |
| 2009/0188266 A1 | 7/2009 | Hung et al. | |
| 2009/0266094 A1 * | 10/2009 | Major | B60H 1/005 62/196.1 |
| 2010/0006258 A1 | 1/2010 | Richter et al. | |
| 2011/0036117 A1 * | 2/2011 | Frohling | B60H 1/00028 62/507 |
| 2011/0067421 A1 | 3/2011 | Shiraishi et al. | |
| 2011/0174000 A1 | 7/2011 | Richter et al. | |
| 2012/0003910 A1 | 1/2012 | Richter | |
| 2012/0102973 A1 | 5/2012 | Oh | |
| 2012/0138697 A1 | 6/2012 | Richter | |
| 2012/0152511 A1 | 6/2012 | Chang et al. | |
| 2012/0174602 A1 | 7/2012 | Olivier et al. | |
| 2012/0291986 A1 | 11/2012 | Richter | |
| 2013/0000265 A1 | 1/2013 | Richter et al. | |
| 2013/0008971 A1 | 1/2013 | Richter et al. | |

FOREIGN PATENT DOCUMENTS

| | | |
|---|---|---|
| DE | 102004051874 B3 | 5/2006 |
| DE | 102005009325 A1 | 8/2006 |
| DE | 102005012557 A1 | 9/2006 |
| DE | 102006009162 A1 | 11/2006 |
| DE | 102006008218 A1 | 12/2006 |
| DE | 102008002408 A1 | 12/2009 |
| FR | 2965219 A3 | 3/2012 |
| JP | 2003231410 A | 8/2003 |
| JP | 2006232264 A | 9/2006 |
| KR | 20100030740 A | 3/2010 |

* cited by examiner

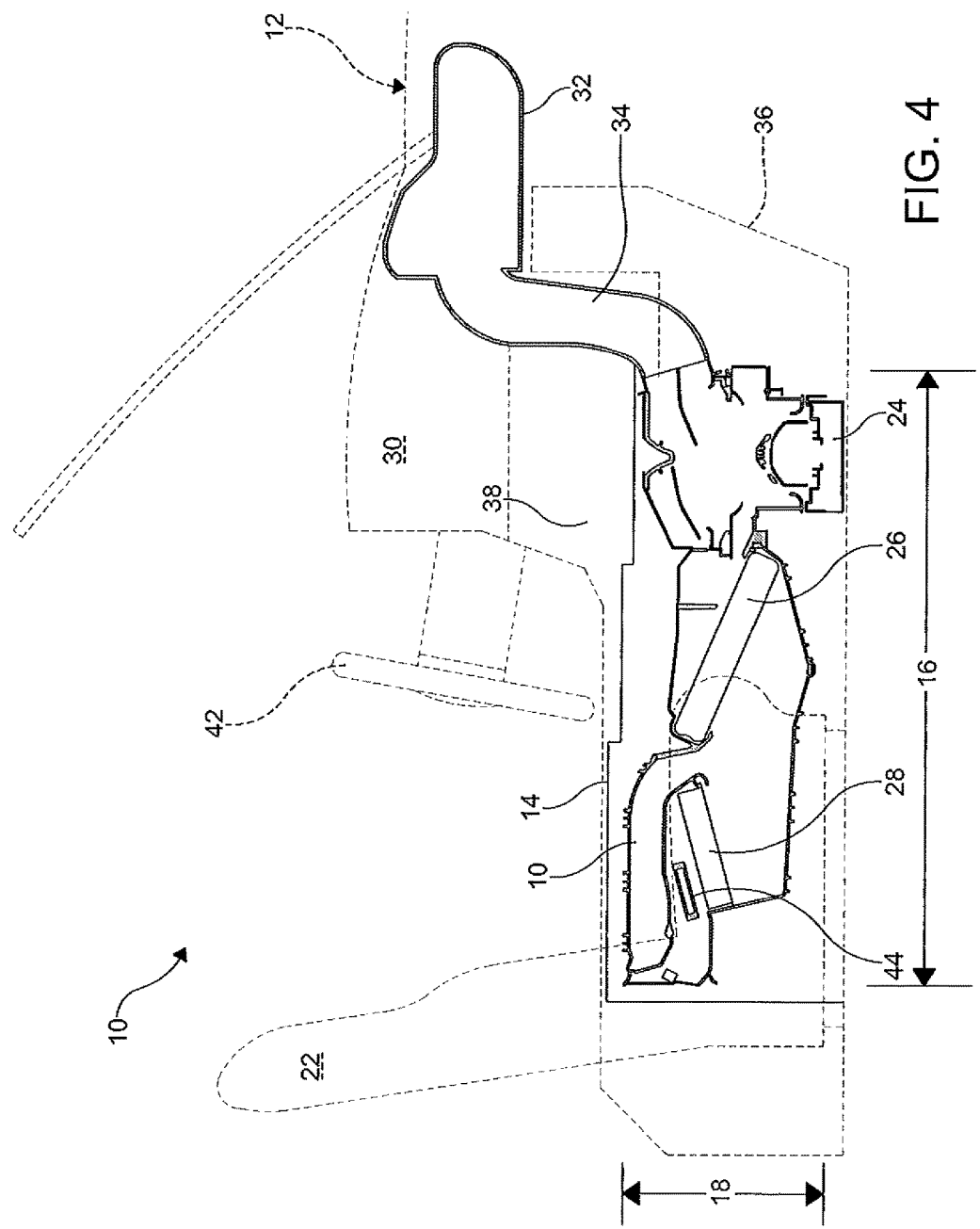

HVAC BLOWER

FIELD OF THE INVENTION

The invention relates to a heating, ventilation, and air conditioning (HVAC) system for a motor vehicle and, more particularly, to a modular HVAC system having minimal packaging requirements.

BACKGROUND OF THE INVENTION

During the design of a motor vehicle, the shape and dimensions of the vehicle body are defined. This determines a maximum amount of space available for vehicle systems and components to be installed. The result of this process is often referred to as establishing the packaging requirements of components. The packaging requirements of HVAC systems, particularly air conditioning units, requires intensive development work because such equipment requires significant space that encroaches upon the interior passenger space of the vehicle. HVAC systems typically include a plurality of heat exchangers, a blower motor, and other electrical and mechanical components which must be accounted for in the packaging requirements.

Such development work is focused on minimizing a size of the HVAC system and on the position of the HVAC system within in the vehicle such that interference with passengers is minimized. As a result, the HVAC system is often placed in an instrument panel to maximize the foot space available to the driver and front seat passenger. However, placing an HVAC system in the instrument panel maximizes the space the instrument panel occupies in a front of the vehicle, thus increasing mounting space in a longitudinal direction of the vehicle.

There remains a need for an HVAC system that does not occupy space in an instrument panel while occupying a minimized amount of space in the interior of a vehicle.

SUMMARY OF THE INVENTION

Concordant and congruous with the present invention, an HVAC system that does not occupy space in an instrument panel while occupying a minimized amount of space in the interior of a vehicle has surprisingly been discovered.

In an embodiment of the invention, an HVAC system for a motor vehicle comprising a housing having a length greater than a width, the housing disposed with the length substantially parallel to a longitudinal axis of the motor vehicle; and a blower assembly disposed within the housing, the blower assembly disposed adjacent an instrument panel of the vehicle.

In another embodiment of the invention, an HVAC system for a motor vehicle comprises a housing having a length greater than a width, the housing disposed with the length substantially parallel to a longitudinal axis of the motor vehicle and at least partially between front seats of the motor vehicle; and a blower assembly disposed within the housing, the blower assembly disposed adjacent an instrument panel of the vehicle.

In another embodiment of the invention, an HVAC system for a motor vehicle comprises a housing having a length greater than a width, the housing disposed with the length substantially parallel to a longitudinal axis of the motor vehicle and at least partially between front seats of the motor vehicle; and a blower assembly in fluid communication with an exterior of the motor vehicle disposed within the housing, the blower assembly disposed adjacent an instrument panel of the vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a cross-sectional view of an HVAC unit and a portion of an interior of a vehicle according to another embodiment of the invention.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
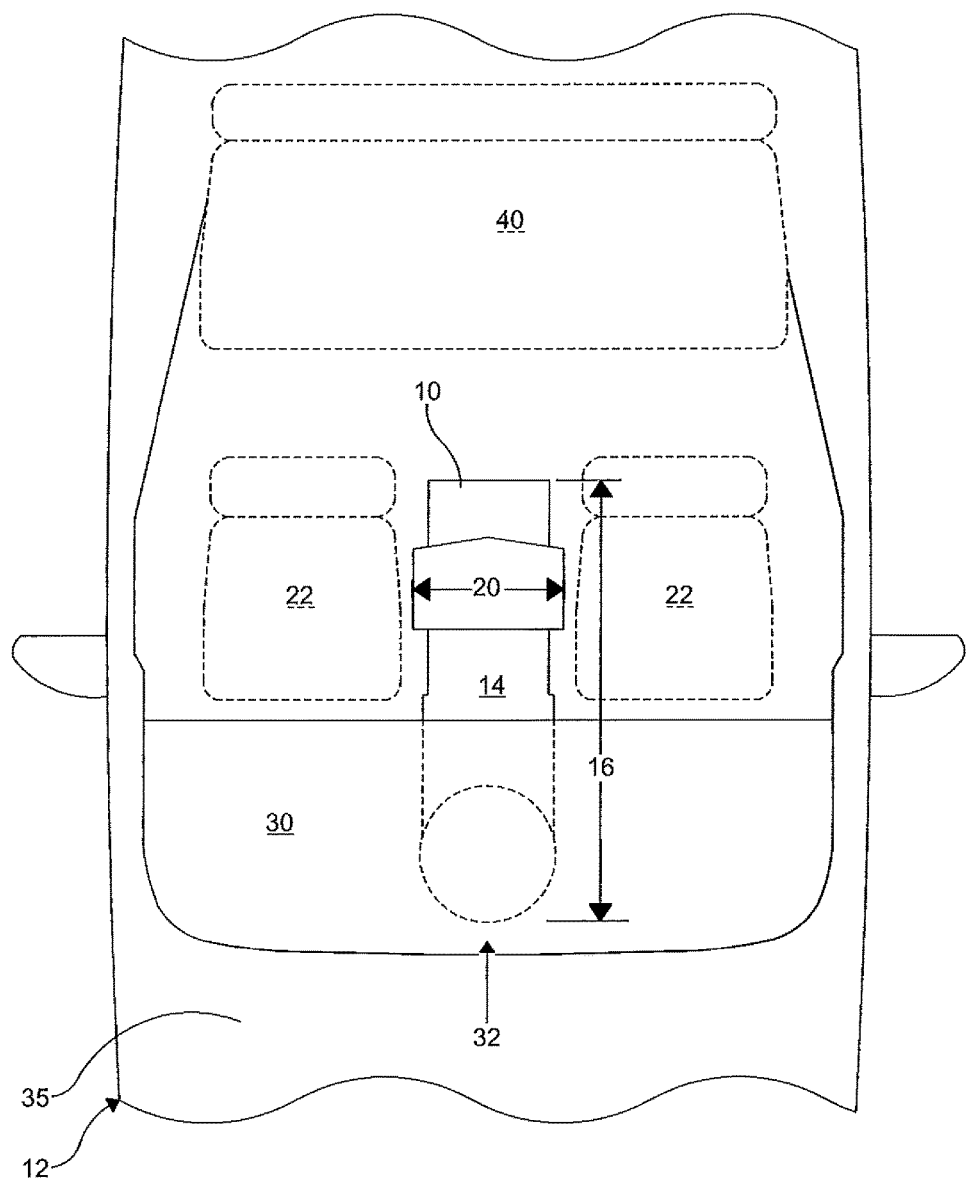
FIG. 1 is a fragmentary schematic top plan view of an interior of a portion of a motor vehicle having an HVAC system therein according to an embodiment of the invention.
Figure 2:
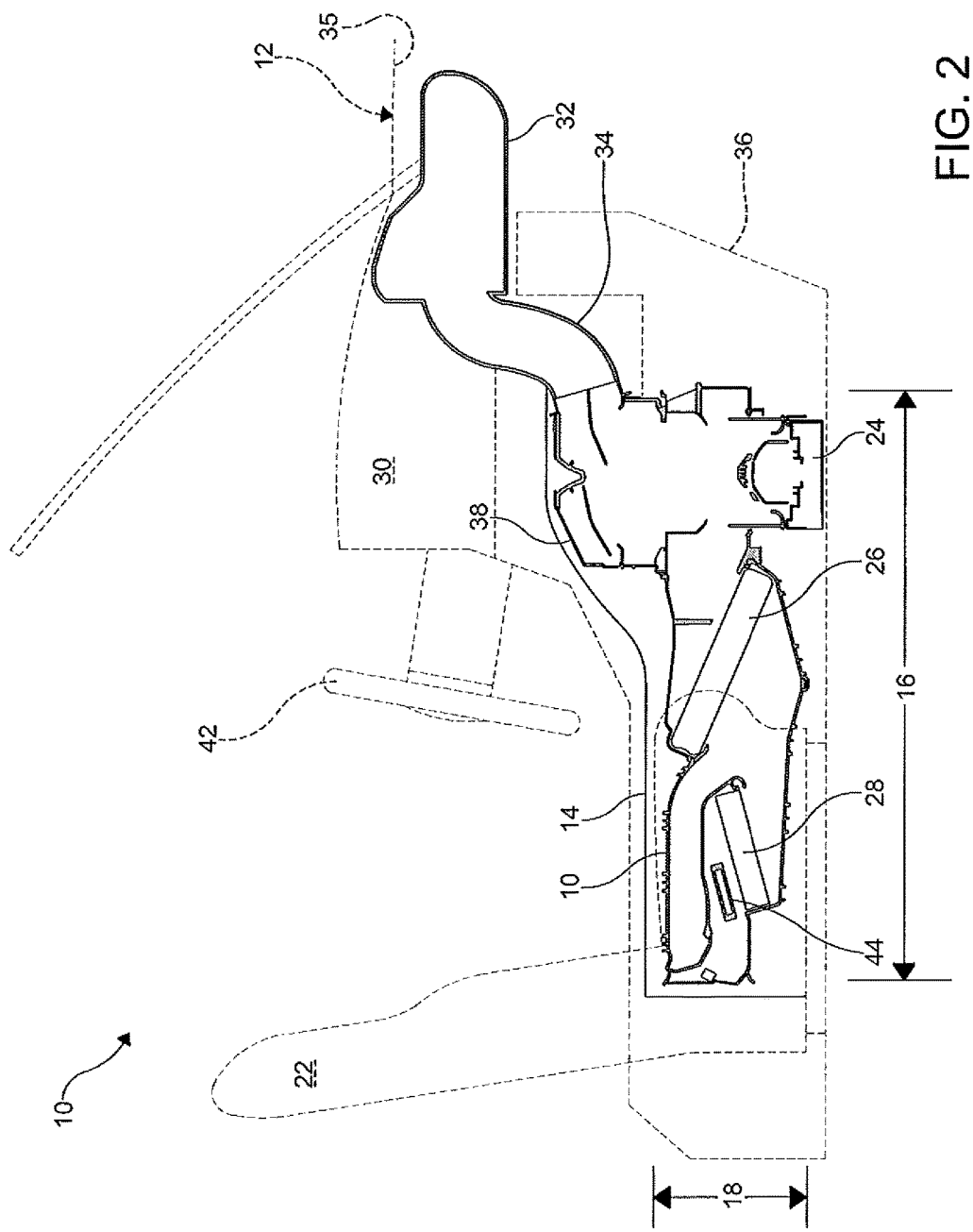
FIG. 2 is a cross-sectional view of the HVAC unit and a portion of the interior of FIG. 1.

FIGS. 1 and 2 show an HVAC system 10 according to an embodiment of the present invention. The HVAC system 10 is disposed in an interior of a motor vehicle 12, such as a motor vehicle having a combustion engine or a battery-powered motor vehicle, but the HVAC system 10 may be disposed in any vehicle requiring an HVAC system.

Figure 3:
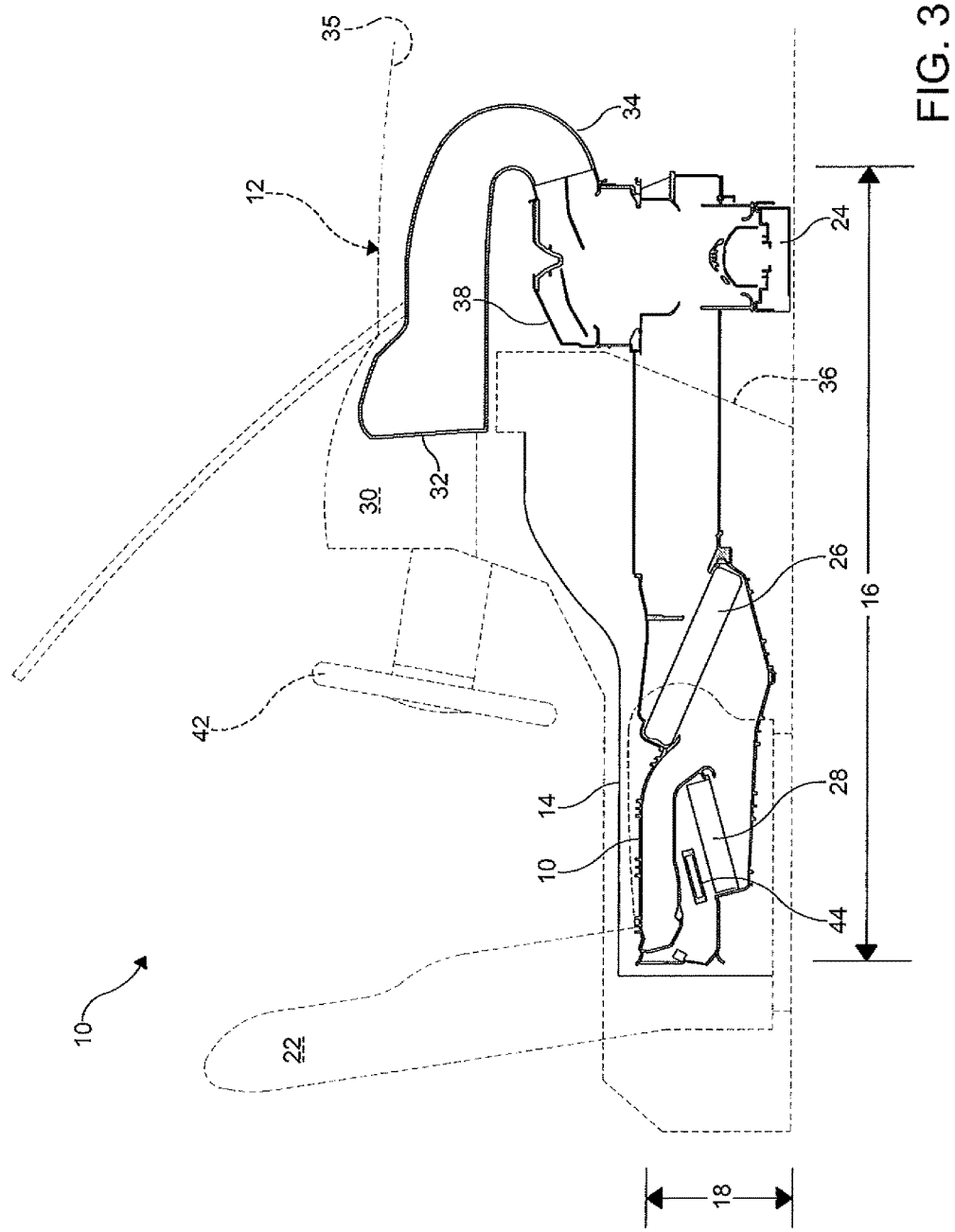
FIG. 3 is a cross-sectional view of an HVAC unit and a portion of an interior of a vehicle according to another embodiment of the invention.

The HVAC system 10 includes a housing 14, a blower assembly 24, a first heat exchanger 26, and a second heat exchanger 28, The dimensions and shape of the housing mirror the general dimensions and shape of the components of the HVAC system 10 disposed therein. As shown in FIGS. 1-3, the components of the HVAC system 10 described herein are aligned in substantially the same plane at substantially the same elevation. However, the components may be oriented with the blower assembly 24 disposed at an elevation above that of either or both of the heat exchangers 26, 28, or the heat exchangers 26, 28 may be disposed at an elevation or elevations above that of the blower assembly 24. Similarly, each of the blower assembly 24, the first heat exchanger 26, and the second heat exchanger 28 may each be at different elevations resulting in an HVAC system 10 and a housing 14 having a stair-step cross-sectional shape, as shown in FIG. 4.

As shown in FIGS. 1-3, a length 16 of the HVAC system 10 is greater than a height 18 thereof. A width 20 of the HVAC system 10 is less than the length 16, but may be greater than or less than the height 18 thereof, as desired. As the width 20 of the HVAC system 10 increases, the height 18 decreases in order to minimize the impact on the packaging requirements of the interior of the vehicle 12. It is desirable to minimize the width 20 of the HVAC system in order to maximize passenger seating space. As best shown in FIG. 1, the HVAC system 10 is disposed between front seats 22 of the vehicle 12 with the length 16 of the HVAC system 10 substantially parallel to a central, longitudinal axis of the vehicle 12. A portion of the HVAC system 10 may be disposed between the front seats 22, such that only the portion containing one or both of the heat exchangers 26, 28, or the entire HVAC system 10 may be disposed therebetween, as desired.

The blower assembly 24 includes a fan, a motor, and other electrical components for drawing air into the HVAC system 10, through the heat exchangers 26, 28, and into the interior of the vehicle 12. The blower assembly 24 is in fluid communication with a fresh air cowl 32 via a conduit 34. The conduit 34 may be disposed partially or completely in the instrument panel 30, below the instrument panel 30, or in an engine compartment 35 of the vehicle 12, as desired. In the embodiment shown in FIGS. 1, 2 and 4, the blower assembly 24 is disposed in the interior of the vehicle 12 and beneath the instrument panel 30. In the embodiment of FIG. 3, the blower assembly 24 is disposed in the engine compartment 35 of the vehicle with a firewall 36 between the blower assembly 24 and the interior of the vehicle 12. The embodiment of FIG. 3 may be used in any motor vehicle, but may be best utilized in a battery-operated or hybrid vehicle having no internal combustion engine or a minimally-sized engine.

The first heat exchanger 26 is disposed downstream from the blower assembly 24 and upstream from the second heat exchanger 28. As shown in FIGS. 1-4, the first heat exchanger 26 is an evaporator adapted to cool air caused to flow through the HVAC system 10. The HVAC system 10 may include conduit (not shown) to provide fluid communication between the HVAC system 10, the first heat exchanger 26, the second heat exchanger 28, or a combination thereof and an exterior of the vehicle 12 to facilitate the flow of condensate therefrom. Typically, the conduit is in communication with a drain having a porous filter therein disposed in a floorboard of the vehicle 12 to facilitate efficient removal of the condensation. By providing conduit to facilitate a flow of condensation to an exterior of the vehicle, contact between condensate and electrical components of the HVAC system 10 and the vehicle 12 is minimized. It is understood that the first heat exchanger 26 may be downstream from the second heat exchanger 28, as desired.

The second heat exchanger 28 is disposed downstream from the first heat exchanger 26. As shown in FIGS. 1-4, the second heat exchanger 28 is a heater core for heating air caused to flow through the HVAC system 10. The second heat exchanger 28 may be any device capable of heating air, as desired. The second heat exchanger 28 may be in communication with a supplemental heater 44, such as a PTC heater, as shown in FIGS. 1-4, or the second heat exchanger 28 may be the only heater in the HVAC system 10. It is understood that the supplemental heater 44 may be any device capable of heating air, as desired.

In use, fresh air is drawn into the HVAC system 10 from an exterior of the vehicle 12 through the fresh air cowl 32 and through the conduit 34 by the blower assembly 24. The fresh air may be supplemented or replaced by recirculated air drawn through the HVAC system 10 from the interior of the vehicle 12 through a recirculated air opening 38. The recirculated air opening 38 is disposed adjacent the instrument panel 30, and may be disposed under the instrument panel 30, in front of the instrument panel 30, or as part of the instrument panel 30, as desired. The air is caused to flow through the heat exchangers 26, 28 by the blower assembly 24. In a cooling mode the air is caused to flow through the first heat exchanger 26 and then caused to flow through a vehicle distribution system (not shown) to cool an Ulterior of the vehicle 12. In a heating mode, the air is caused to flow through the second heat exchanger 28 and caused to flow through a vehicle distribution system to heat an interior of the vehicle 12. The air flowing through the second heat exchanger 28 may also be heated by the supplemental heater 44. The vehicle distribution system comprises conduits or ducting (not shown) and vents (not shown). The HVAC system 10 may be used as a stand-alone HVAC system for the vehicle 12, or the HVAC system 10 may supplement a standard HVAC system as known in the art. The HVAC system 10 may be in fluid communication with vehicle distribution systems having ducting and vents to provide heated or cooled air to the front passenger compartment, rear passenger compartment, both the front and the rear passenger compartments of the vehicle, to and through the front seats 22 and/or the rear seats 40, and/or to and through a steering wheel 42 of the vehicle.

Because the blower assembly 24 is either below the instrument panel 30 (FIGS. 1, 2, and 4) or behind the firewall 36 and in the engine compartment (FIG. 3), the noise, vibration, and harshness (NVH) associated with the HVAC system 10, and the blower assembly 24 in particular, is minimized so as not to disturb passengers in the vehicle 12 during operation. Another benefit of the location of the blower assembly 24 is that the space occupied by components of the HVAC system 10 in the instrument panel 30 is minimized, thereby freeing up packaging space in the instrument panel 30 for other components or to facilitate a minimally-sized instrument panel 30 for a more open front end of the interior of the vehicle 12. By having the length 16 of the HVAC system 10 greater than the width 20 thereof and the HVAC system 10 disposed parallel to a central, longitudinal axis of the vehicle 12, the HVAC system 10 occupies space in the vehicle that is typically unutilized, such as under the instrument panel 30 or that is underutilized as empty space or storage space, such as a center console. Also, in the embodiment of the HVAC system 10 of FIGS. 1, 2, and 4, the blower assembly 24 disposed beneath the instrument panel 30 in the housing 14 and is more easily accessed for maintenance purposes and to replace associated air filtration devices (not shown).

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. An HVAC system for a motor vehicle comprising:
 a housing having a first portion disposed in an interior of the motor vehicle and a second portion disposed in an engine compartment of the motor vehicle, the housing having a length greater than a width, the housing disposed with the length substantially parallel to a longitudinal axis of the motor vehicle;
 a blower assembly disposed within the second portion of the housing, wherein a wall is disposed between the blower assembly and the interior of the motor vehicle;
 a fresh air cowl in fluid communication with the blower assembly, the fresh air cowl providing fluid communication between an exterior of the motor vehicle and the blower assembly to facilitate a flow of fresh air through the HVAC system, the fresh air cowl disposed above the blower assembly;
 a conduit providing fluid communication between the fresh air cowl and the blower assembly, the conduit including a first portion through which the fresh air flows in a direction towards a front end of the motor vehicle and a second portion through which the fresh air flows in a direction towards a rear end of the motor vehicle, the second portion of the conduit leading into the blower assembly;
an evaporator disposed in the first portion of the housing downstream of the blower; and
a heater core disposed in the first portion of the housing downstream of the evaporator, wherein the conduit includes a 180 degree bend formed therein between the first portion of the conduit and the second portion of the conduit.

2. The HVAC system of claim 1, wherein the housing is disposed at least partially between front seats of the motor vehicle.

3. The HVAC system of claim 1, further comprising a recirculated air opening formed in the housing providing fluid communication between an interior of the motor vehicle and the blower assembly.

4. The HVAC system of claim 1, wherein the blower assembly is in fluid communication with at least one of: front seats of the motor vehicle, a rear seat of the motor vehicle, and a steering wheel of the motor vehicle.

5. The HVAC system of claim 1, wherein the housing has a stair-step cross-sectional shape.

6. An HVAC system for a motor vehicle comprising:
a housing having a first portion disposed in an interior of the motor vehicle and a second portion disposed in an engine compartment of the motor vehicle, the housing having a length greater than a width, the housing disposed with the length substantially parallel to a longitudinal axis of the motor vehicle and at least partially between front seats of the motor vehicle;
a blower assembly disposed within the second portion of the housing, wherein a wall is disposed between the blower assembly and the interior of the motor vehicle;
a fresh air cowl in fluid communication with the blower assembly, the fresh air cowl providing fluid communication between an exterior of the motor vehicle and the blower assembly to facilitate a flow of fresh air through the HVAC system, the fresh air cowl disposed above the blower assembly;
a conduit providing fluid communication between the fresh air cowl and the blower assembly, the conduit including a first portion through which the fresh air flows in a direction towards a front end of the motor vehicle and a second portion through which the fresh air flows in a direction towards a rear end of the motor vehicle, the second portion of the conduit leading into the blower assembly;
an evaporator disposed in the first portion of the housing downstream of the blower; and
a heater core disposed in the first portion of the housing downstream of the evaporator, wherein the conduit includes a 180 degree bend formed therein between the first portion of the conduit and the second portion of the conduit.

7. The HVAC system of claim 6, further comprising a recirculated air opening formed in the housing providing fluid communication between the interior of the motor vehicle and the blower assembly.

8. The HVAC system of claim 6, wherein the blower assembly is in fluid communication with at least one of: the front seats of the motor vehicle, a rear seat of the motor vehicle, and a steering wheel of the motor vehicle.

9. The HVAC system of claim 6, wherein the housing has a stair-step cross-sectional shape.

10. An HVAC system for a motor vehicle comprising:
a housing having a first portion disposed in an interior of the motor vehicle and a second portion disposed in an engine compartment of the motor vehicle, the housing having a length greater than a width, the housing disposed with the length substantially parallel to a longitudinal axis of the motor vehicle and at least partially between front seats of the motor vehicle;
a blower assembly in fluid communication with an exterior of the motor vehicle disposed within the second portion of the housing, wherein a wall is disposed between the blower assembly and the interior of the motor vehicle;
a fresh air cowl in fluid communication with the blower assembly, the fresh air cowl providing fluid communication between an exterior of the motor vehicle and the blower assembly to facilitate a flow of fresh air through the HVAC system, the fresh air cowl disposed above the blower assembly;
a conduit providing fluid communication between the fresh air cowl and the blower assembly, the conduit including a first portion through which the fresh air flows in a direction towards a front end of the motor vehicle and a second portion through which the fresh air flows in a direction towards a rear end of the motor vehicle, the second portion of the conduit leading into the blower assembly;
an evaporator disposed in the first portion of the housing downstream of the blower; and
a heater core disposed in the first portion of the housing downstream of the evaporator, wherein the conduit includes a 180 degree bend formed therein between the first portion of the conduit and the second portion of the conduit.

11. The HVAC system of claim 1, wherein the blower, the evaporator, and the heater core are substantially aligned in a direction of flow along a horizontal plane.

12. The HVAC system of claim 1, further comprising a supplemental heater disposed in the portion of the housing disposed in the interior of the motor vehicle, the supplemental heater configured to heat a flow of air therethrough.

* * * * *